UNITED STATES PATENT OFFICE.

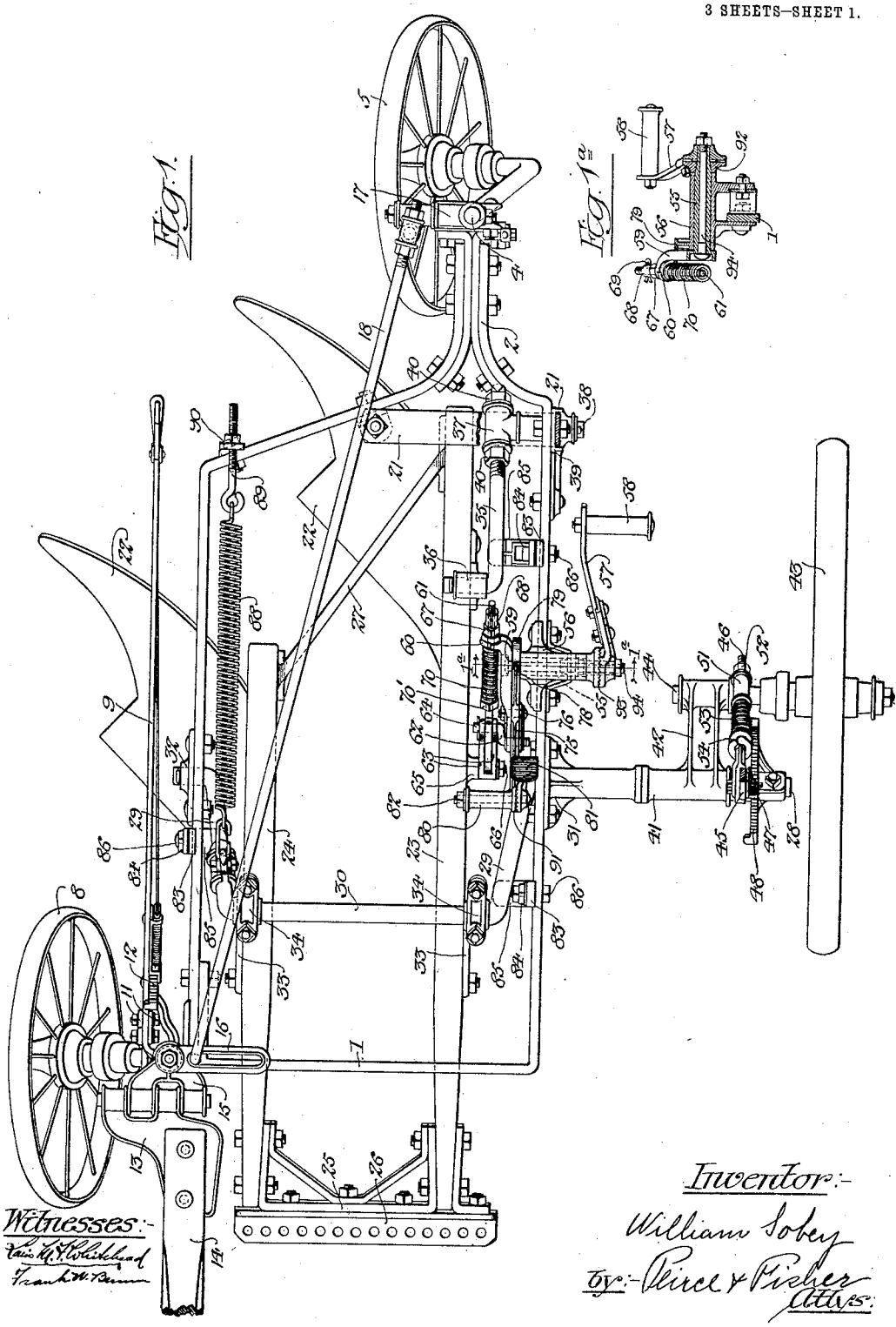

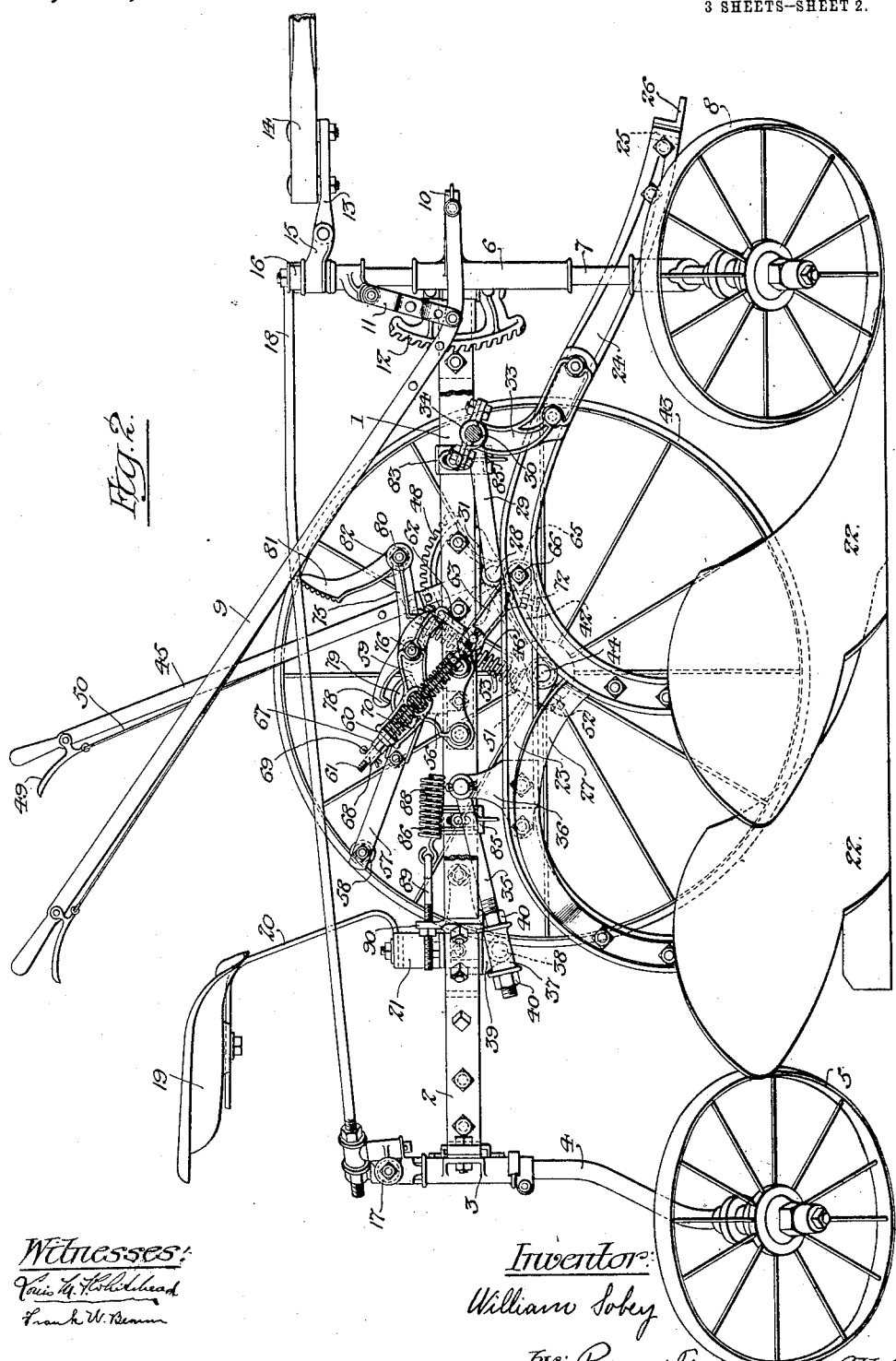

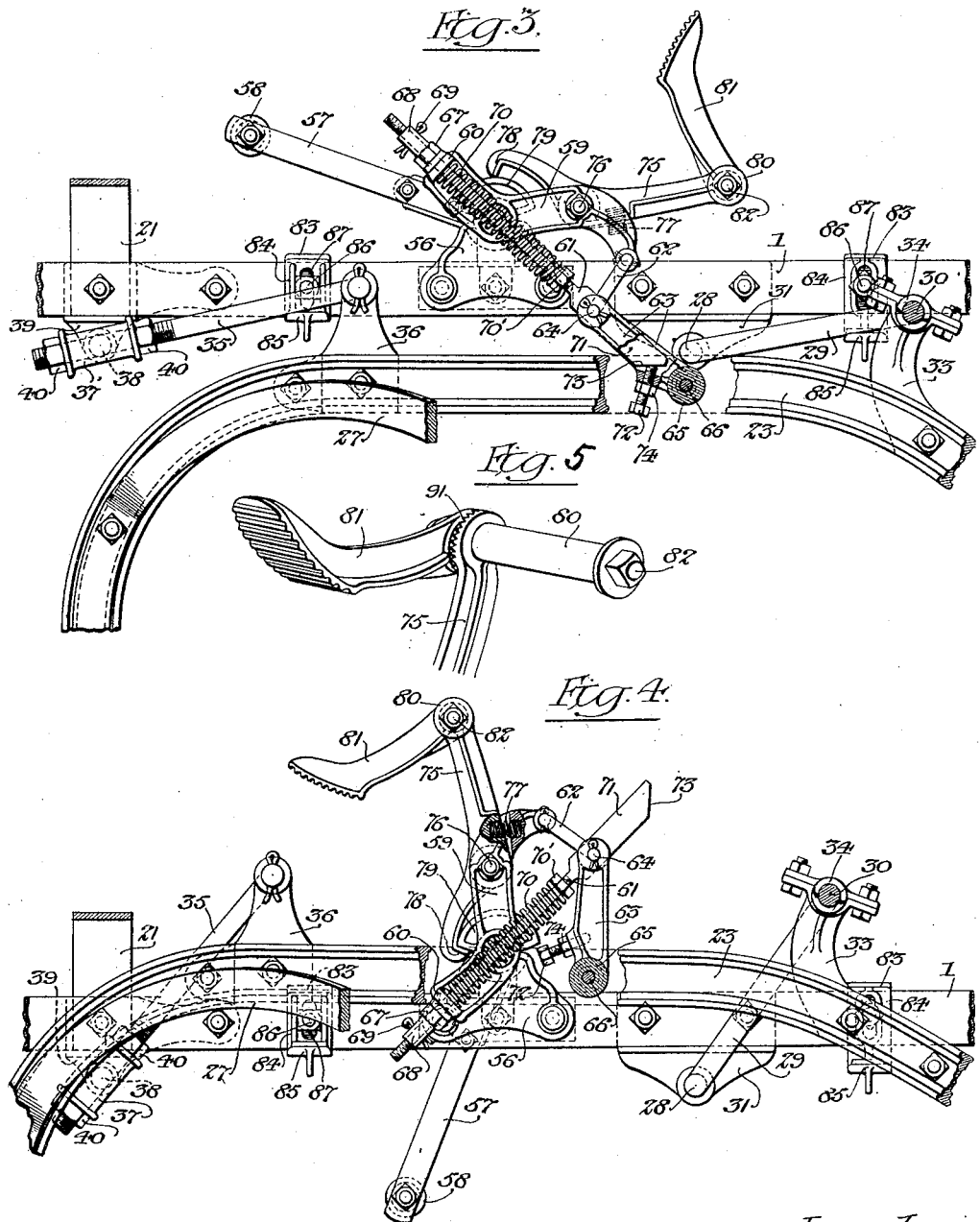

WILLIAM SOBEY, OF RACINE, WISCONSIN, ASSIGNOR TO J. I. CASE PLOW WORKS, OF RACINE, WISCONSIN, A CORPORATION.

WHEELED PLOW.

1,113,501. Specification of Letters Patent. Patented Oct. 13, 1914.

Application filed April 23, 1909. Serial No. 491,833.

*To all whom it may concern:*

Be it known that I, WILLIAM SOBEY, a citizen of the United States, and a resident of Racine, county of Racine, and State of Wisconsin, have invented certain new and useful Improvements in Wheeled Plows, of which the following is a specification.

The invention relates to wheeled plows and more particularly to the means for supporting the plow in the frame so that it may be raised and lowered, and to the mechanism for shifting the plow to and from working position.

The invention seeks to provide improved means for supporting the plow in the frame and to provide simple and effective mechanism which can be operated by the rider's feet to raise and lower the plow and which is arranged to yieldingly hold the plow in working position.

The invention consists in the features of improvement hereinafter set forth, illustrated in the accompanying drawings and more particularly pointed out in the appended claims.

In the drawings, Figure 1 is a plan view of the improved plow showing the parts in the position assumed when the plow is in the ground; Fig. 1ª is a detail section on the line 1ª—1ª of Fig. 1; Fig. 2 is a side elevation with the plow in working position and with parts of the frame broken away to show the improved lift mechanism; Fig. 3 is a view in elevation of the improved mechanism for supporting and for raising and lowering the plow with the parts in the position assumed when the plow is in the ground; Fig. 4 is a similar view with the parts in the position assumed when the plow is in its raised position; and Fig. 5 is a perspective view of the upper end of the lowering foot lever.

The drawings illustrate the improvements applied to a gang plow but it will be understood that they are also applicable to a wheeled plow having but a single plow bottom. The plow frame 1 is of usual construction and is provided at its rear end with an extension 2 which carries the sleeve 3 within which the vertical spindle 4 of the rear furrow wheel 5 is arranged. The front, right-hand corner of the plow frame is provided with a sleeve 6 through which extends the vertical spindle 7 of the front furrow wheel 8. The spindle 7 of the front furrow wheel can be shifted as usual through the sleeve 6 to level the frame of the plow, by means of a lever 9 that is pivoted to a forward extension 10 on the sleeve and connected to the upper end of the spindle by a link 11. This lever is provided with the usual locking dog for engaging a segment 12 fixed to the sleeve 6. A bracket 13 to which the tongue 14 is connected, is hinged to a part 15 fixed to the upper end of the vertical spindle 7 of the front furrow wheel. A slotted arm 16 on the spindle 7 is connected to an arm 17 on the spindle 4 of the rear furrow wheel by a rod 18. The rider's seat 19 is secured at the upper end of a spring bar 20 that is fixed at its lower end to a suitable support 21 on the frame of the machine. The parts thus far described may be of any suitable or usual construction.

The plow bottoms 22 are mounted upon the rear ends of suitable plow beams 23 and 24. These beams are connected at their forward ends by a cross-bar 25 to which a clevis bar 26 is attached. At their rear ends, the plow beams 23 and 24 are connected by a diagonal brace bar 27. The plows are hung in the machine frame by means of a bail, that is connected to the forward ends of the plow beams, and by means of an arm or semi-bail that is connected to the rear end of the plow beam 23. The bail comprises a shaft portion 28, crank arms 29, and a transverse portion 30 extending between the ends of the crank arms. The shaft of the plow bail is journaled in suitable bearings 31 and 32 fixed to the side bars of the frame. Brackets 33, fixed to the plow beams and projecting upwardly therefrom, are provided with bearings 34 that engage the transverse portion 30 of the bail. The arm or half bail 35 is provided with an offset front end journaled in the upper end of a bracket 36 that is fixed to and projects upwardly from the rear end of the plow beam 23. The rear end of the arm or half bail 35 extends through a sleeve or hollow T-shaped head 37 that is fixed to the inner end of a stud 38. The stud 38 is journaled as shown, in a bracket 39 fixed to the adjacent side bar of the machine frame. Nuts 40 threaded upon the rear end of the arm 35 engage the ends of the sleeve 37 and adjustably connect the arm or half bail to the pivot or stud 38 whereon it swings. By this means, the effective length of the arm or half bail 35 may be adjusted as desired. The bearing 31 for the bail shaft at the land side of the machine is extended as shown, and the bail shaft 28 projects beyond this bearing and carries a sleeve 41 having an arm 42 on its outer end. The land side wheel 43 is mounted on a short shaft 44 that is fixed at its inner end to the end of the arm 42. A lever 45 loosely mounted on the end of the bail shaft 28, is connected to the end of the arm 42 by a link rod 46, and a dog 47 on the lever is arranged to engage any one of a series of notches in a segment 48 that is fixed to the end of the bail shaft 28. In this way, the land side wheel is adjustably connected to the bail shaft and shifts therewith as the plow is raised and lowered to automatically level the plow frame, the land wheel being lowered as the frame is raised. A shifter 49 for the dog 47 is pivoted to the upper end of the lever 45 and is connected thereto by a rod 50. The link rod 46 extends through a sleeve 51 at the end of the arm 42 and is provided with a nut 52 threaded on its lower end into engagement with the sleeve. A spring 53 extends between the sleeve and a washer 54 on the upper end of the link rod and yieldingly holds the land side wheel in position so that it may pass over irregularities in the surface of the ground without unduly jarring the plow frame.

The mechanism for raising and lowering the plow is controlled through the medium of a short shaft 55 journaled in a bracket 56 that is fixed to and projects upwardly from the side bar of the frame on the land side of the machine. A lifting foot lever 57 is connected to the outer end of this shaft and this lever extends rearwardly toward the rider's seat when the plow is in working position, as shown in Figs. 1, 2 and 3. At its rear end, it is provided with an offset foot-piece 58 upon which pressure can be applied by the operator to lift the plow from working position. The shaft 55 extends through the bearing on the bracket 56 and has an arm 59 fixed to its inner end adjacent the inner side of the bracket. This arm 59 is fixed to the inner end of the shaft intermediate its ends and one end portion extends forwardly from the shaft or pivot and the other end extends upwardly and rearwardly therefrom, as shown in Figs. 2 and 3, when the plow is in working position. The rear end of the arm 59 is provided with an inwardly projecting, perforated lug 60 through which one end of a toggle link 61 extends. A connector link 62 is pivoted to the opposite ends of the arm 59 and toggle link 61. A second toggle link 63 is pivotally connected by the offset end 64 of the connector link 62 to the toggle link 61. The opposite end of the toggle link 63 is pivotally connected to a projecting lug or boss 65 upon the side of the plow beam 23, and is held against displacement by a bolt 66 extending through the beam and lug and having a nut on its outer end engaging the hub of the toggle link 63.

The toggle link 61 is round for the greater portion of its length and a nut 67 is threaded upon its end and engages the lug 60 on the arm 59. This nut is provided with a slotted sleeve 68 and a cotter pin 69 extending through the link engages the slot of the sleeve and locks the nut in position. A stout spring 70 is coiled about the toggle link 61 and extends between the lug 60 and a nut 70' that is threaded upon the toggle link 61 near its pivoted end. The spring 70 holds the toggle link 61 in the position shown with the nut 67 thereon engaging the lug 60 on the arm 59. The link 61 is movable longitudinally on the arm 59 against the pressure of the spring. It should be noted that the toggle link 61 extends across the end of the shaft 55 and is longitudinally shiftable in a line intersecting and at right angles to the axis of the shaft. The toggle link 63 is double (see Figs. 1 and 2) and the toggle link 61 is provided with a flat portion 71 that extends beyond the toggle pivot 64 and is arranged to shift into position between the two parts of the link 63 when the plow is in the ground, as shown in Figs. 1, 2 and 3. An adjustable stop bolt 72 is threaded through a lug on the link 63 adjacent its pivot, and extends into the space between the parts of the link 63 so as to engage a bevel 73 on the end of the extension 71 of the toggle link 61, when the plow is in working position. This stop device is provided with a lock nut 74 and serves to arrest the movement of the toggle links as the plow is lowered to working position and to hold the links in line, at or near dead center position, so that the plow is held by the toggle links in working position.

The stop bolt 72 can be so adjusted as to arrest the movement of the toggle links before they reach the dead center position so that the plow can "float" or rise and fall in the ground, while the toggle links swing upon their respective pivots. Preferably, however, the stop bolt 72 is so adjusted that the toggle links swing to position slightly beyond the dead center when the plow is lowered, as shown in Figs. 2 and 3, to thereby lock the plow in the ground. But, in this position, the plow is yieldingly held in the ground and can rise, if it meets an obstruction, since the toggle as a whole can shift longitudinally against the pressure of the spring 70 without breaking the joint between its links 61 and 63. During this longitudinal shift or yielding movement of the toggle in the direction of its line of centers, the arm 59 and parts connected thereto remain substantially at rest, while the toggle link 61 shifts through the lug 60 on the arm and the connector link 62 oscillates on the end of the arm 59. By this arrangement, the toggle serves to lock the plow in the ground but does not hold it rigidly in this position. If the plow strikes an obstruction, it can lift up and the toggle will yield, without breaking the joint between its links, against the pressure of the spring 70. As soon as the obstruction is passed, the spring 70 will again force the plow back to its normal working position. By adjusting the nut 67 on the end of the toggle link 61, the tension of the spring 70 can be adjusted.

The portion of the arm 59 adjacent the connector link 62 is double, and a depressing or lowering foot lever 75 extends between the sections thereof and is pivotally connected thereto by a bolt 76. A spring 77 extends between the end of the arm 59 and the foot lever 75 and is arranged in suitable seats or sockets in these parts as most clearly shown in Fig. 4. At its inner end, the foot lever 75 is provided with a nose or catch 78 that is adapted to engage a segment 79 on the bracket 56 to hold the plow in the raised position shown in Fig. 4. The outer end of the foot lever is provided with a laterally offset foot-piece 80 and also with a supplemental foot-piece 81 extending upwardly and rearwardly from the foot lever and adjustably connected thereto by a bolt 82.

When the plow is in raised position, the parts of the plow-supporting and raising and lowering mechanism are in the position shown in Fig. 4 with the catch 78 held by the spring 77 in engagement with the shoulder at the end of the segment 79. To lower the plow, the operator presses upon the foot-piece 80 of the lowering foot lever 75. This first shift lowers the foot lever about the pivot 76 against the pressure of the spring 77 and disengages the catch 78 from the shoulder of the segment. The foot lever 75 then engages the end of the arm 59, and the further movement of the foot lever, effected by pressing upon the foot-piece 80 or the foot-piece 81, shifts the arm 59 and moves the plow into the ground and the toggle links into the straight line position shown in Figs. 2 and 3, so that the plow is locked in working position. The toggle, however, can yield longitudinally against the pressure of the spring 70, so that the plow is yieldingly and not rigidly held in position. Or, as stated, the stop bolt 72 can be so adjusted that the toggle links will not quite shift to their dead center position, so that the plow will be free to float while the toggle links oscillate upon their pivots.

The foot-piece 81 projects upwardly as shown in Figs. 2 and 3, when the plow is in working position, and can be conveniently used by the operator to control the plow if the toggle is so adjusted as to permit the plow to float. Moreover, this supplemental foot-piece enables a boy or other rider having short legs, to properly manipulate the shift mechanism to force the plow into the ground.

In raising the plow from the positions shown in Figs. 1, 2 and 3, the operator presses upon the foot-piece 58 of the lifting foot lever 57; this turns the shaft 55 and arm 59 thereon and the link 62 connected to the arm breaks the joint between the toggle links 61 and 63 and raises the plow from working position. At the end of the upward movement, the spring 77 forces the catch 78 on the foot lever 75 into engagement with the shoulder on the segment 79 so that the plow is locked in raised position. When the plow is in the ground, the nose or catch 78 rides upon the edge of the segment 79, as shown in Figs. 1, 2 and 3.

The crank arms 29 of the plow-supporting bail, are considerably shorter than the arm or half bail 35 and the toggle link 63 is pivoted to the plow beam 23 at a point nearer to the bail than it is to the arm 35. By this arrangement, a differential movement will be given to the plow beams and plow bottoms as they are raised and lowered, so that the points of the plows will be depressed in advance of the heels thereof in lowering the plows from their raised position and the plow points will be lifted in advance of the heels in starting the plow from working position. By this means, the plows will enter and leave the ground point first so that the draft of the team will aid both in putting the plows into the ground and in lifting them therefrom. By shifting the nuts 40 on the arm or half bail 35, the effective length of this arm or the distance between its pivot point and its end that is connected to the plow can be adjusted to give the desired tip to the plow bottoms in raising and lowering the same.

Stops are provided for limiting the downward shift of the supporting bail and arm for the plows and for holding the plows in working position. Two of these stops are arranged upon the opposite side bars of the frame for engaging the crank arms 29 of the bail, and another stop is arranged in position on the side bar of the frame at the land-side of the machine for engaging the arm or half bail 35. Each of these stops comprises a piece 83 which fits over the side bar of the frame and is provided with lugs overlapping the edges thereof, and an L-shaped piece 84 that is adjustable on the piece 83 and is provided with an inwardly extending stop lug 85 for engagement either with the crank arms of the bail or with the arms 35. The stop piece 83 and 84 are held in position on the side bars by bolts 86 extending therethrough and through the side bars. The parts 84 are provided with vertical slots 87 through which the bolts 86 extend, so that the stop lugs 85 may be adjusted vertically to hold the plow in the desired position when it is in the ground. A lift spring 88 is connected at its forward end to one of the crank arms 29 of the bail and at its rear end by an adjusting screw 89 to an upstanding lug 90 at the rear of the plow frame.

Both the lifting foot lever 57 and the supplemental foot-piece 81 on the depressing foot lever 75 are adjustable. The laterally extending foot-piece 80 is formed in piece with the depressing foot lever 75. The hub of the supplemental foot piece and the end of the foot lever 75 are provided with radial interlocking teeth, as indicated at 91 in Fig. 1. The bolt 82 extends through the foot piece 80 and the hub of the foot-piece 81 and adjustably holds the latter in position upon the depressing foot lever 75. The shaft 55 whereon the lifting foot lever is mounted, is hollow, as shown in Fig. 1ª, and is preferably formed in one piece with the arm 59 at its inner end. A collar 92 fits over the outer, square end of the hollow shaft 55, and this collar and the hub of the foot lever 57 are provided with radial interlocking teeth, as indicated at 93 in Fig. 1. A bolt 94 (see Fig. 1ª) extends through the hollow shaft 55 and the hub of the foot lever 57. By loosening the nuts on the bolts 82 and 94, the lifting foot lever 57 and the supplemental depressing foot lever 81 can be readily adjusted to suit different operators.

When the parts are in the raised position shown in Fig. 4, the supplemental foot-piece 81 can not be acted upon conveniently by the rider but the foot-piece 80 is then in such position that he can readily apply pressure thereto to trip the latch 78 and thus permit the plows to drop to the ground. The foot-piece 80 is then moved away from the rider's seat and pressure cannot as readily be applied thereto, but at this point, the foot-piece 81 is in such position that the operator can readily apply pressure thereto to shift the toggle levers 61 and 63 past the dead center and into locked position. At the same time, the spring 70 will be compressed but the operator need give the matter no more attention, since the spring 70 will complete the work of forcing the plows to their full depth as the team advances. It will thus be noted that the foot-piece 80 is in convenient position when the plow is raised to trip the latch 78, and the foot-piece 81 is in convenient position when the greatest pressure must be applied to the foot mechanism. The foot-piece 81 is farther from the axis about which the lift mechanism turns than the foot-piece 80, and thus has greater leverage and enables the operator to compress the spring 70 and lock the toggle past its center.

It should be noted that the improved raising and lowering toggle mechanism for the plow acts to positively shift the plow to and from working position, but yieldingly holds the plow in working position without breaking the toggle joint. It should also be noted that, in the preferred construction illustrated the landside wheel is shifted with the bail as the plow is raised and lowered to thereby automatically level the frame.

It is obvious that numerous changes can be made in the details set forth without departure from the essentials of the invention as defined in the claims.

I claim as my invention:—

1. In a wheeled plow, the combination with the frame and the plow hung thereon to shift to and from working position, of a swinging arm on said frame a toggle interposed between said arm and plow and shiftable to a dead center position to hold the plow in the ground, said toggle being arranged to yield longitudinally in the direction of its line of centers, and a spring interposed between said arm and said toggle for resisting the yielding movement of said toggle, substantially as described.

2. In a wheeled plow, the combination with the frame and plow hung thereon to shift to and from working position, of a toggle interposed between said frame and plow and arranged to shift to a dead center position to hold the plow in the ground and to yield longitudinally in such position without breaking the joint thereof, a spring for resisting the yielding movement of said toggle, and a shift lever pivoted at a fixed point on said frame and connected to said toggle for breaking the joint thereof and raising the plow, substantially as described.

3. In a wheeled plow, the combination with the frame, a plow hung on said frame to shift to and from working position, of a rock arm on said frame, a raising and lowering toggle interposed between said arm and said plow and arranged to yield longitudinally in straight line position without breaking the joint thereof to yieldingly hold the plow in the ground, a spring for resisting the yielding movement of said toggle, and lever mechanism pivoted directly on said frame and connected to said toggle to raise and lower the plow, substantially as described.

4. In a wheeled plow, the combination with the frame, a plow hung thereon to shift to and from working position, and a land-side wheel connected to shift with the plow to automatically level the frame as the plow is raised and lowered, of a rock arm on said frame, a raising and lowering toggle connected to the arm and said plow and arranged to yield longitudinally in straight line position and in the direction of its line of centers without breaking the joint thereof, a spring for resisting the yielding movement of said toggle, and raising and lowering foot levers pivoted directly on said frame and connected to said toggle, substantially as described.

5. In a wheeled plow, the combination with the frame and plow hung thereon to shift to and from working position, of jointed toggle links interposed between said frame and plow and arranged to shift to a straight line position to hold said plow in the ground, a pivoted support for one of said links whereon said link is longitudinally movable in line with the pivot of said support, and a spring for yieldingly holding said link in position, substantially as described.

6. In wheeled plows, the combination with the frame and plow hung thereon to shift to and from working position, of a rock arm on said frame, jointed toggle links connected to said plow and said arm, one of said links having a stop arranged to engage the other to hold said links in line and said plow in the ground, a spring interposed between said arm and one of said links, said toggle links being longitudinally movable against the pressure of said spring, and foot lever mechanism pivotally mounted on the frame and connected to said yielding toggle links to raise and lower the plow, substantially as described.

7. In a wheeled plow, the combination with the frame and plow hung thereon to shift to and from working position, of jointed toggle links connected to said frame and plow and arranged to yield longitudinally in straight line position without breaking the joint between said links and thereby yieldingly hold said plow in the ground, and a shift lever pivoted at a fixed point on said frame and connected directly to the joint between said links, substantially as described.

8. In a wheeled plow, the combination with the frame and plow hung thereon to shift to and from working position, of a rock arm mounted on the frame, a toggle link mounted to shift longitudinally on said arm, a spring for resisting the longitudinal shift of said link, and a second toggle link connected to the plow and to the toggle link on said arm, substantially as described.

9. In a wheeled plow, the combination with the frame and plow hung thereon to shift to and from working position, of a rock arm mounted on the frame, a toggle link mounted to shift longitudinally on said arm, a spring for resisting the longitudinal shift of said link, a second toggle link connected to the plow and to the link on said arm, a stop device arranged to hold said links in line with the plow yieldingly held in working position, and raising and lowering foot levers connected to said arm, substantially as described.

10. In a wheeled plow, the combination with the frame and plow hung thereon to shift to and from working position, of a rock arm mounted on the frame, a toggle link mounted to shift longitudinally on said arm, a spring interposed between said arm and said link for resisting the longitudinal shift of said link, a second toggle pivotally connected to the link on said arm and to the plow, an adjustable stop device for limiting the shift of said toggle links, as the plow is lowered, arranged to hold said links in line, with the plow yieldingly held in working position, and a pair of oppositely arranged foot levers for shifting said arm to raise and lower the plow, substantially as described.

11. In a wheeled plow, the combination with the frame and plow hung thereon to shift to and from working position, of a rock arm mounted on the frame, a toggle link mounted on said arm and longitudinally movable thereon in a line intersecting the pivot of said arm, a spring for yieldingly holding said link in position, a second toggle link pivotally connected to the link on said arm and to said plow, a stop on one of said links arranged to engage the other, as the plow is lowered to hold said links in line with said plow yieldingly held in working position, and means for shifting said arm to raise and lower the plow, substantially as described.

12. In a wheeled plow, the combination with the frame and plow hung thereon to shift to and from working position, of a toggle comprising jointed links one of which is connected to said plow, a rock arm on the frame having a guide lug at one end through which the other of said toggle links is shiftable, a connector link extending between the other end of said arm and the joint of said toggle, a spring for yieldingly holding the toggle link on said arm in position, and means for shifting said arm to raise and lower the plow, substantially as described.

13. In a wheeled plow, the combination with the frame and plow hung thereon to shift to and from working position, of a toggle comprising jointed links one of which is connected to said plow, a rock arm on the frame having a guide lug at one end through which the other of said toggle links is shiftable, a connector link extending between the other end of said arm and the joint of said toggle, a spring on the toggle link on said arm for yieldingly holding the same in position, a stop device for arresting said toggle in straight line position to yieldingly hold said plow in the ground, and foot levers connected to said arm for raising and lowering the plow, substantially as described.

14. In a wheeled plow, the combination with the frame, of a front bail and a rear arm journaled on said frame, a plow hung on said bail and said arm, an arm on the shaft of said front bail, a land side wheel on said arm, means for adjustably locking said arm to said bail shaft, a pair of oppositely extending foot levers and an arm mounted directly on said frame to shift together about a common axis, jointed toggle links connected to said plow and to said arm and arranged to be shifted by said foot levers to positively raise and lower the plow, and a spring interposed between said arm and said toggle links for permitting the yielding movement of the plow and toggle links without breaking the joint and independently of said foot levers, substantially as described.

15. In a wheeled plow, the combination with the frame and a plow hung thereon to shift to and from working position, of foot levers and a rock arm pivoted directly on said frame, toggle links connected to said arm and to said plow and arranged to be shifted by said foot levers to positively raise and lower the plow, and a spring interposed between said rock arm and said toggle links arranged to permit the longitudinal yielding movement of said toggle links without breaking the joint thereof and independently of said foot levers, substantially as described.

16. In a wheeled plow, the combination with a frame, a plow hung thereon to shift to and from working position, a depressing foot lever pivotally mounted on the frame and connected to the plow, said lever being arranged to swing forwardly from the rider's seat to force the plow into the ground, a laterally extended foot piece fixed to the end of said lever and a supplemental foot piece adjustably connected to the end of said lever and extending rearwardly therefrom toward the rider's seat, substantially as described.

17. In a wheeled plow, the combination with a frame, and a plow hung thereon to shift to and from working position, an arm pivotally mounted on said frame and connected to said plow, a foot lever pivoted on said arm and having a catch thereon, a lug on the frame with which said catch engages to hold the plow in raised position, said foot lever being arranged to swing forwardly from the rider's seat to release said catch and force the plow into the ground, a laterally extending foot piece on the end of said lever and a supplemental foot piece connected to the end of said lever and extending rearwardly therefrom toward the rider's seat, substantially as described.

18. In a wheeled plow, the combination with the frame and a plow hung thereon, of a shaft journaled on the frame, a raising and lowering toggle connecting said shaft to said plow, a lifting foot lever and a depressing foot lever connected to said shaft for shifting the same in opposite directions to raise and lower the plow, said lifting foot lever being adjustably connected to said shaft, and a supplemental foot-piece adjustably connected to said depressing foot lever and extending rearwardly therefrom toward the rider's seat, substantially as described.

19. In a wheeled plow, the combination with the frame and the plow hung thereon, of jointed toggle links interposed between the frame and the plow, lift mechanism for shifting said toggle links to raise the plow, and a spring interposed between said lift mechanism and said toggle links, whereby said toggle links yieldingly hold the plow in the ground when in straight line position, substantially as described.

20. In a wheeled plow, the combination with the frame and the plow hung thereon, of a pair of raising and lowering foot levers pivotally mounted upon the machine frame, toggle links connected to said plow and to said foot levers to raise and lower the plow, and a spring interposed between said links and said foot levers arranged to permit the yielding movement of said links in straight line position, substantially as described.

21. In a wheeled plow, the combination with the frame and the plow hung thereon, of a pair of oppositely arranged raising and lowering foot levers pivoted to the frame to swing about a common point, toggle links interposed between said levers and said plow and operated by said foot levers to raise and lower the plow, and a yielding spring connection between said foot levers and said toggle links arranged to permit the yielding movement of said links when in straight line position, substantially as described.

22. In a wheeled plow, the combination of the frame, a front bail and a rear arm journaled on said frame, a plow hung on said bail and said arm, foot levers and a rock arm pivoted directly on said frame, a toggle link mounted on said arm to shift longitudinally thereon, a spring coiled about said toggle link and interposed between the same and said arm for resisting the longitudinal shift of said link, and a second toggle link pivoted directly to the plow and to the toggle link on said arm, substantially as described.

WILLIAM SOBEY.

Witnesses:
Roy Fred Adams,
Ray Winfield Martin,